United States Patent
Kim

(10) Patent No.: US 9,520,768 B2
(45) Date of Patent: Dec. 13, 2016

(54) INVERTER CONTROL APPARATUS AND CONTROL METHOD THEREOF

(71) Applicant: LSIS CO., LTD., Anyang-si, Gyeonggi-do (KR)

(72) Inventor: Kwang Woon Kim, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 201 days.

(21) Appl. No.: 14/286,682

(22) Filed: May 23, 2014

(65) Prior Publication Data
US 2015/0023075 A1  Jan. 22, 2015

(30) Foreign Application Priority Data
Jul. 16, 2013  (KR) .................. 10-2013-0083612

(51) Int. Cl.
| | |
|---|---|
| *H02M 1/32* | (2007.01) |
| *H02M 7/06* | (2006.01) |
| *H02M 7/48* | (2007.01) |
| *H02M 7/5387* | (2007.01) |
| *H02H 7/122* | (2006.01) |

(52) U.S. Cl.
CPC ............... *H02M 1/32* (2013.01); *H02H 7/122* (2013.01); *H02M 7/06* (2013.01); *H02M 7/48* (2013.01); *H02M 7/53875* (2013.01); *H02M 2001/325* (2013.01); *H02M 2001/327* (2013.01)

(58) Field of Classification Search
CPC ....................................... H02M 7/06
USPC ......................................... 363/132, 98, 131
See application file for complete search history.

(56) References Cited

U.S. PATENT DOCUMENTS

| | | |
|---|---|---|
| 5,912,794 A | 6/1999 | Ichikawa |
| 6,064,172 A | 5/2000 | Kuznetsov |
| 2011/0193506 A1* | 8/2011 | Hayashi ................. H02P 6/002 |
| | | 318/400.12 |
| 2012/0187893 A1* | 7/2012 | Baba ...................... H02P 25/22 |
| | | 318/722 |

FOREIGN PATENT DOCUMENTS

| | | |
|---|---|---|
| EP | 0792008 | 8/1997 |
| EP | 1400434 | 3/2004 |
| EP | 2434628 | 3/2012 |

(Continued)

OTHER PUBLICATIONS

European Patent Office Application Serial Number 14175507.4, Search Report dated Mar. 9, 2015, 8 pages.

(Continued)

*Primary Examiner* — Matthew Nguyen
*Assistant Examiner* — Trinh Dang
(74) *Attorney, Agent, or Firm* — Lee, Hong, Degerman, Kang & Waimey

(57) ABSTRACT

An apparatus and method for controlling an operation of an inverter are provided. In the inverter control apparatus, an operation signal input unit detects a current of each phase output from an inverter. An error detecting unit detects whether there is a fault of the inverter on the basis of the current detected by the operation signal input unit. A controller controls driving of the inverter according to a type of the fault detected by the error detecting unit. A storage unit stores a kind of fault of the inverter and a corresponding fault type on the basis of the current detected in the operation signal detecting unit.

14 Claims, 4 Drawing Sheets

(56) References Cited

FOREIGN PATENT DOCUMENTS

| | | |
|---|---|---|
| JP | 07-308074 | 11/1995 |
| JP | 09-201070 | 7/1997 |
| JP | 09-233832 | 9/1997 |
| JP | 09-238476 | 9/1997 |
| JP | 11-262270 | 9/1999 |
| JP | 2001-327174 | 11/2001 |
| JP | 2004-106664 | 4/2004 |
| JP | 2012-005229 | 1/2012 |
| JP | 2012-070573 | 4/2012 |

OTHER PUBLICATIONS

Japan Patent Office Application Serial Number 2014-121296, Office Action dated May 28, 2015, 4 pages.

* cited by examiner

INVERTER CONTROL APPARATUS AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0083612, filed on Jul. 16, 2013, the contents of which are hereby incorporated by reference herein in its entirety.

BACKGROUND

The present disclosure relates to an inverter, and particularly, to an apparatus and method for controlling an operation of an inverter.

A three-phase pulse width modulation (PWM) inverter among inverters, which invert DC into AC, is used in a new renewable energy conversion system and a hybrid vehicle including various industrial application fields such as an motor drive, uninterruptible power supply, or active power filter.

A design and control technology for an inverter system becomes generalized, but various kinds of unexpected inverter faults frequently occur in industrial fields. In particular, since the inverter fault affects an operation of an overall system, fault detection and diagnosis is necessary for increasing reliability of the system and removing adverse effects due to the fault.

In addition, fault determination of the inverter system is typically performed by analyzing and controlling each inverter according to each fault type in order to minimize various damages on the inverter system due to operation and fault of the inverter system.

That is, each case of various faults possibly occurring in the inverter system is determined, and fault recovery for normalization and driving of the inverter system is executed according to the determined case (a cause of accident). However, schemes for controlling the operation of the inverter system are different according to a kind of fault of the inverter system. Accordingly, in the case where a plurality of faults occur, an abnormal inverter system may be re-driven before operation for fault recovery.

In this case, a secondary fault and various losses may occur therefrom.

SUMMARY

Embodiments provide an inverter control apparatus and method for easily determining whether to recover according to an inverter fault, and accordingly executing driving for normalization.

In one embodiment, an inverter control apparatus includes: an operation signal input unit detecting a current of each phase output from an inverter; an error detecting unit detecting whether there is a fault of the inverter on the basis of the current detected by the operation signal input unit; a controller controlling driving of the inverter according to a type of the fault detected by the error detecting unit; and a storage unit storing a kind of fault of the inverter and a corresponding fault type on the basis of the current detected in the operation signal detecting unit.

In another embodiment, an inverter control method includes: confirming whether there is a fault of an inverter on the basis of a current signal of each phase of the inverter; when the fault of the inverter occurs, confirming a type of the occurred fault; and controlling driving of the inverter according to the confirmed fault type.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Terms and words used herein should not be construed limitedly by the common and dictionary meanings, but should be interpreted by meaning and concepts conforming to the technical idea of this invention based on the principle that the concept of terms and words can be defined properly by the inventor in order to describe this invention in the best ways. Therefore, it should be understood that since the configurations of the embodiments and drawings described herein are merely exemplary embodiments of the present invention, but do not include all the technical spirits of the present invention, there may be provided various equivalents and modifications which can be substituted for the above configurations.

Figure 1:
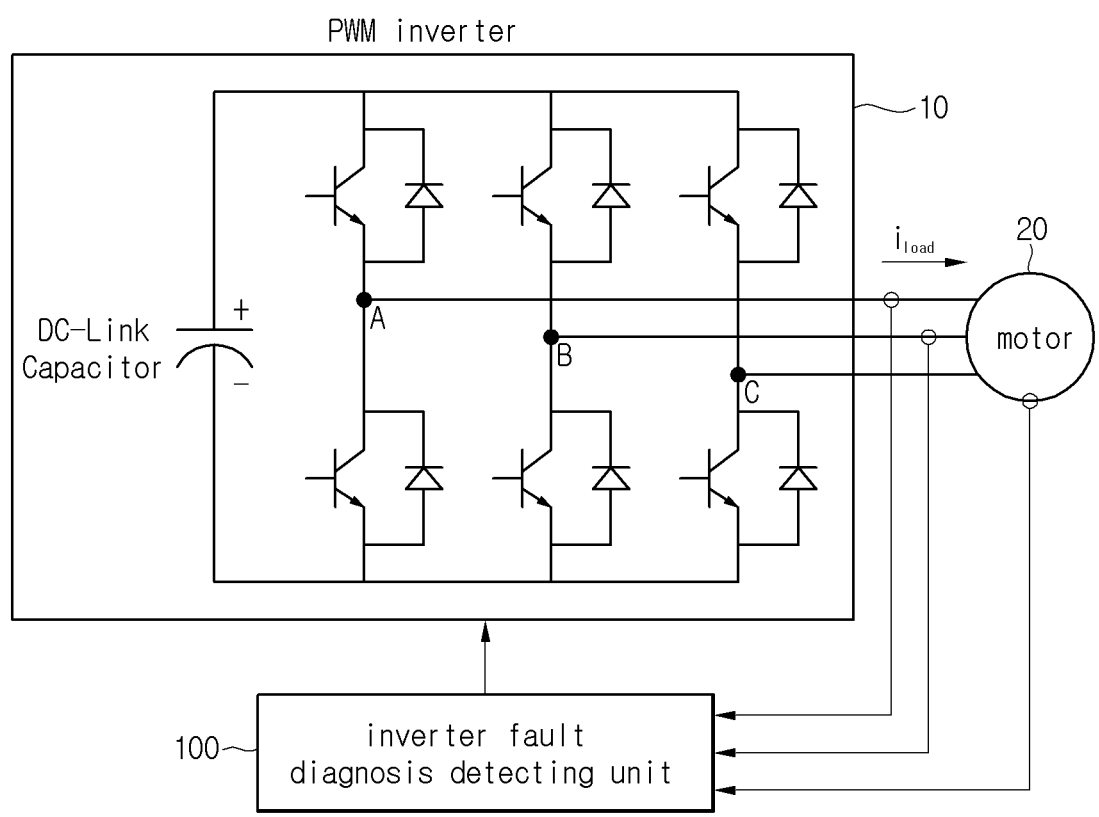
FIG. 1 is a block configuration of an inverter system to which an embodiment is applied.

FIG. 1 is a block configuration of an inverter system to which an embodiment is applied.

Referring to FIG. 1, an inverter system to which an embodiment is applied includes a pulse width modulation (PWM) inverter 10, a motor 20, and an inverter fault diagnosis detecting unit 100.

The inverter fault diagnosis detecting unit 100 receives a current of each phase A, B, and C output from the PWM inverter 10 and may diagnose a fault of an open circuit of the three-phase PWM inverter 10 on the basis of the received current signal.

A configuration of the inverter fault diagnosis detecting unit 100 is described in detail with reference to FIG. 2.

Figure 2:
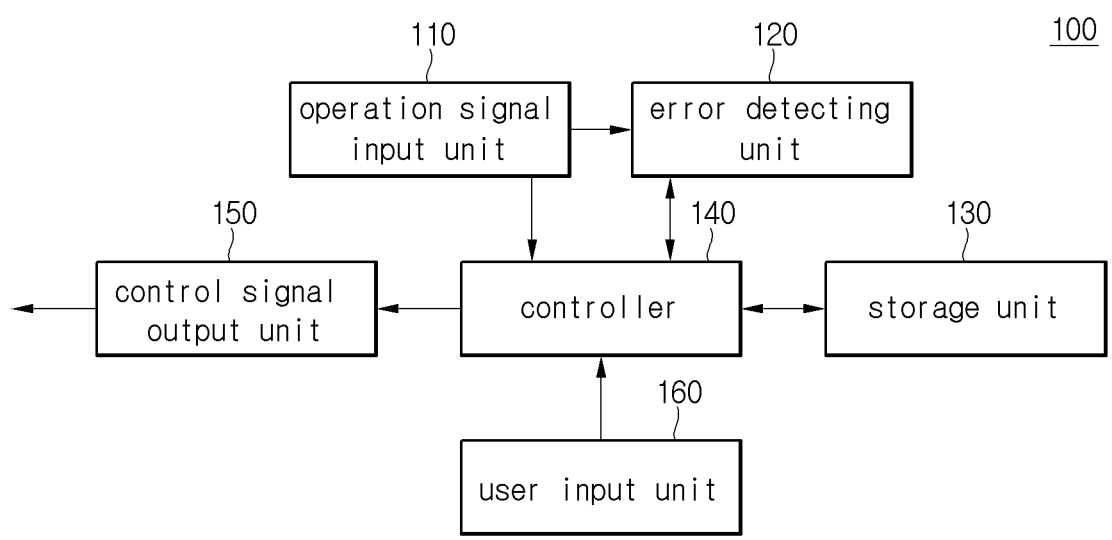
FIG. 2 is a block configuration of an inverter fault diagnosing and detecting unit to which an embodiment is applied.

FIG. 2 is a block configuration of the inverter fault diagnosis detecting unit to which an embodiment is applied.

Referring to FIG. 2, the inverter fault diagnosis detecting unit 100 includes an operation signal input unit 110, an error detecting unit 120, a storage unit 130, a controller 140, a control signal output unit 150, and a user input unit 160.

The operation signal input unit 110 may detect a current for each phase A, B, and C output from the PWM inverter 10, and output the detected current signals to the error detecting unit 120. Besides, the operation signal input unit 110 may receive signals of whether operations of the inverter 10 and the motor 20 are normal.

The error detecting unit 120 may check the current signal of each phase A, B, and C of the inverter output from the operation signal input unit 110, and accordingly detect a fault (error) of the inverter. In an embodiment, four fault types of the inverter are exemplarily described.

As a first type, there is a warming type fault (hereinafter referred to as a first type). The first type may include over-temperature of a motor or an inverter, or a fault of a temperature sensor. An inverter control operation according to the first type fault may prevent an input torque command value of a preset specific value or greater from being input or derate a command value with a preset slope to drive the inverter. For the above-described case of the first type fault, since damage on the inverter from a fire is prevented by limiting an input command value and driving the inverter, there is no need to stop driving the inverter by blocking a PWM signal.

As a second type, there is a latch type fault (hereinafter referred as to the second type). The second type may include a reception error of controller area network (CAN) communication, over-voltage, a current sensor fault, or a power module fault, etc. An inverter control operation according to the second type fault may stop driving the inverter by blocking a PWM signal when a fault is detected.

As a third type, there is a level type fault (hereinafter referred as to the third type). The third type may occur due to low voltages of a control power supply and a driving power supply. In addition, for the third type fault, in the case where there is no or short of power-supplying from outside due to the fault, the driving of the inverter may be normalized when the driving of the inverter is temporarily stopped and then the power supply is normally recovered.

As a fourth type, there is a retry type fault (hereinafter referred as to the fourth type). The fourth type may include overcurrent, a motor sensor fault, or an arm short-circuited fault, etc. The fourth type fault may be a fault that may be falsely detected due to an external noise source. Accordingly, in order to prevent false detection, a control is made to stop driving the inverter in a set period or for the set number of times. Then the inverter is normally driven and, when the driving and stopping of the inverter is repeated for the set number of times, the driving of the inverter may be finally stopped.

The storage unit 130 may match and store a fault state of the inverter with a fault type according to the fault state.

Figure 3:
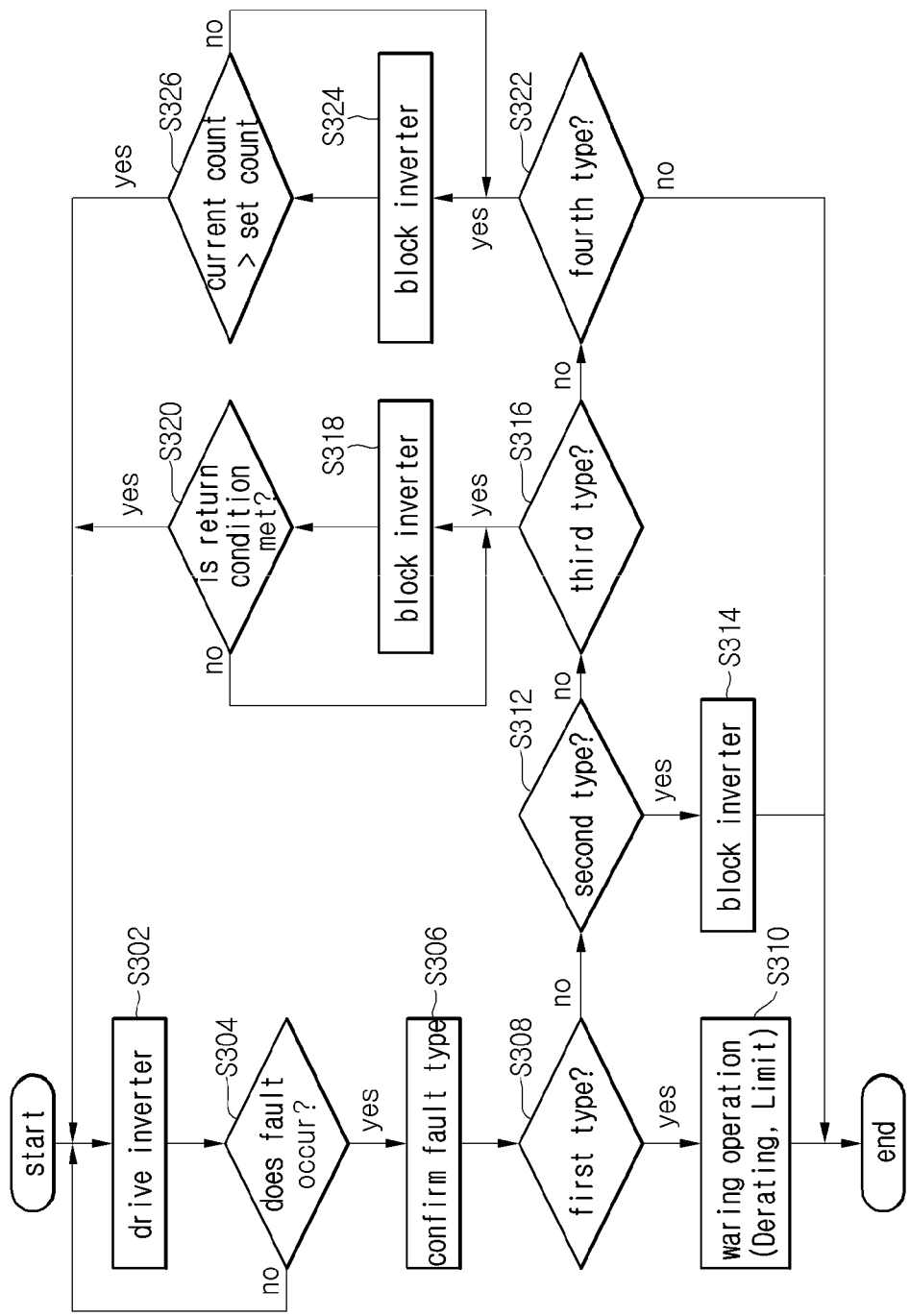
FIG. 3 is a flowchart of an inverter control operation according to an embodiment.

FIG. 3 is a flowchart of an inverter control operation according to an embodiment.

Referring FIG. 3, the controller 140 of the inverter fault diagnosis detecting unit 100 according to an embodiment may continuously determine (operation S304) fault causes according to the various fault types described in relation to FIG. 2 in an inverter driving mode (operation S302).

When occurrence of the fault is detected, the controller 140 may confirm a type of the detected fault (operation S306).

A sequence of confirming the fault type may be flexible. In an embodiment, it is exemplarily described that a first type fault to an nth type fault are sequentially confirmed.

The controller 140 may determine that the confirmed fault type is the first type (operation S308).

When the fault type is determined as the first type, the controller 140 may generate an inverter control signal according to the first type. That is, the controller 140 may prevent an input torque command value of a preset specific value or greater from being input or allow an inverter control signal reducing the present command value to be generated and output through the control signal output unit 150.

On the contrary, when the fault type is not the first type, the controller 140 determines whether the fault type is the second type (operation S312).

When the fault type is confirmed as the second type, the controller 140 may generate an inverter control signal according to the second type. That is, the controller 140 may generate and output a control signal for blocking the driving of the inverter according to the fault cause (operation S314).

On the contrary, when the fault type is not the confirmed second fault type, the controller 140 determines whether the fault type is the third type (operation S316).

When the fault type is confirmed as the third type, the controller 140 may generate an inverter control signal according to the third type. That is, the controller 140 may generate and output a control signal for blocking the driving of the inverter according to the fault cause. Then, the controller 140 determines whether a return condition to drive the inverter (the above-described normal power supply in FIG. 2) is met (operation S320). The controller 140 may re-drive the inverter according to the determination result.

Furthermore, when the fault type is not determined as the third type, the controller 140 determines the fault type is the fourth type (operation S322).

When the fault type is confirmed as the fourth type, the controller 140 may generate an inverter control signal according to the fourth type. That is, the controller 140 may generate and output a control signal for blocking the driving of the inverter according to the fault cause (operation S324). Then, for the fourth fault type, since the fault may occur due to an external noise source, the inverter may be turned on/off for the predetermined number of times or in a predetermined period in order to prevent false detection of the faults. The controller 140 may determine whether the number of times or the period of the turning on/off of the inverter is greater than a preset count number (operation S326).

When the number of times or the period of the turning the inverter on/off is not greater than the preset count number, the controller 140 may turn on/off the inverter for the preset number of times after a predetermined waiting time. In addition, when the inverter is turned on/off for the number of times exceeding the preset count number, the controller 140 re-determines the fault cause, and re-drives the inverter or maintains blocking the inverter.

Figure 4:
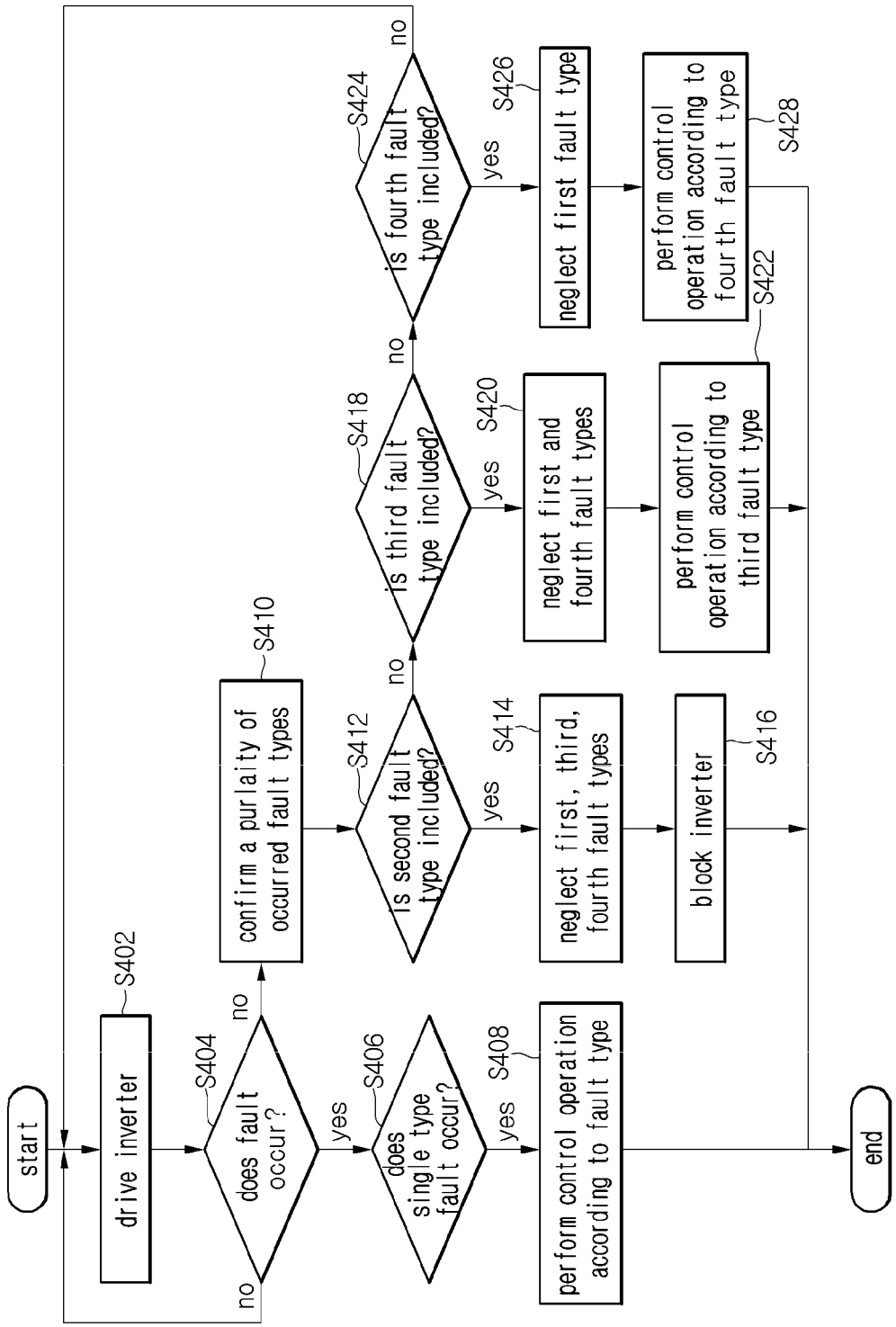
FIG. 4 is a flowchart of an inverter control operation according to another embodiment.

FIG. 4 is a flowchart of an inverter control operation according to another embodiment.

Referring to FIG. 4, the controller 140 of the inverter fault diagnosis detecting unit 100 according to an embodiment may continuously determine fault causes according to the various fault types described in relation to FIG. 2 (operation S404).

When the fault is detected, the controller 140 may determine whether the detected fault is a single type fault (operation S406).

When the detected fault is the single type fault including only any one of the various fault types described in relation to FIG. 2, the controller 140 may perform operation according to the fault type. The control operation according to the fault type is described in relation to FIGS. 2 and 3, and omitted here.

On the contrary, when the detected fault is confirmed as a composite fault type including a plurality of fault types among the various fault types described in relation to FIG. 2, the controller 140 preferentially determines whether the fault type includes the second type (operation S412).

As described in relation to FIGS. 2 and 3, when the second type fault is detected, the controller 140 generates a controls signal for stopping the driving of the inverter. On the contrary, when the detected fault is the first, third, or fourth fault type, the controller 140 may generate a control signal not for stopping the driving of the inverter or for re-driving the inverter when a predetermined condition is met.

Accordingly, since, for the second fault type, the driving of the inverter is required to be stopped, a fault type having a priority in the inverter control according to the fault may be the second type.

When the plurality of fault types are confirmed and the second type is included, the controller 140 neglects other fault types (the first, third, and fourth types) and generates a control signal for blocking the driving of the inverter. However, when the fault is neglected, a fault state according to the control signal generation for driving the inverter may be neglected, but notification for the fault or information on the state may be detected and output to a user.

On the contrary, when a fault including the plurality of fault types occurs but the second type fault is not included, the controller 140 determines whether the third type fault is included (operation S418).

For the third type fault, similar to the second type fault, the driving of the inverter is stopped when the fault occurs. However, when the return condition to drive the inverter is met, the inverter may be re-driven. Accordingly, the third type fault may have a higher priority than the fourth type in confirming the fault type.

Accordingly, when the third type fault is detected, the controller 140 may neglect the first and fourth faults (operation 5420) and perform a control operation of the inverter according to the third type fault (operation S422).

When a fault including the plurality of fault types occurs but the second and third type faults are not included, the controller 140 may determines whether the fourth type fault is included (operation S424).

When the fourth type fault is detected, similarly to the second and third type faults, the controller 140 stops driving the inverter when the fault occurs. However, since a fault cause may be various, the controller 140 may drive the inverter so that the inverter is turned on/off in a designated period or for the designated number of times. Accordingly, since the operation of the inverter is preferentially turned off for the second and third fault types, a priority of the fourth type fault that the driving of inverter is not unconditionally turned off may be designated to be low.

The controller 140 may neglect the first fault type for which the driving of the inverter is not turned off according to a fault including the fourth type fault among the plurality of fault types and perform control operation according to the fourth fault type.

In an embodiment, it is exemplarily described that, when a fault including a plurality of fault types occurs, a sequence of confirming the fault types is that a fault type requiring an inverter to be stopped is preferentially confirmed. However, the priority of the fault types may be determined by user inputs according to importance of the fault Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An inverter control apparatus comprising:
   an operation signal input unit detecting a current of each phase output from an inverter;
   an error detecting unit detecting whether there is an inverter fault based on the detected current;
   a controller controlling driving of the inverter according to a type of the detected inverter fault; and
   a storage unit storing a fault state of the inverter and a corresponding fault type based on the detected current,
   wherein the controller classifies the detected fault into a first fault type limiting an input command value according to the detected fault, a second fault type disabling the driving of the inverter, a fault third type temporarily disabling the driving of the inverter and re-enabling the driving of the inverter according to a condition to drive the inverter, and a fourth fault type turning on/off the driving of the inverter, and
   wherein the controller outputs an inverter driving control signal corresponding to the detected fault type according to a preset priority.

2. The inverter control apparatus according to claim 1, wherein;
   the controller turns on/off the driving of the inverter for a predetermined period or for a predetermined number of times when the fourth fault type is detected; and
   the controller disables the driving of the inverter when the fault is detected for the predetermined number of times or during the predetermined period.

3. The inverter control apparatus according to claim 1, wherein the controller prevents an input torque command value of a specific value or greater from being input or reduces a preset command value when the first fault type is detected.

4. The inverter control apparatus according to claim 1, wherein the controller disables the driving of the inverter when the third fault type is detected, detects whether a power state returns to a normal state, and re-enables driving of the inverter when the power state returns to the normal state.

5. The inverter control apparatus according to claim 1, wherein the controller sets the second fault type to have a highest priority when the priority is determined according to the detected fault type.

6. The inverter control apparatus according to claim 5, wherein the priority according to the detected fault type is set in order of the second fault type, the third fault type, the fourth fault type, and the first fault type.

7. The inverter control apparatus according to claim 5, wherein the controller controls to drive the inverter according to the detected fault type having the highest priority and ignores a detected fault type having a lower priority.

8. An inverter control method comprising:
   detecting a current of each phase output from an inverter;
   detecting whether there is an inverter fault based on the detected current;
   storing a fault state of the inverter and a corresponding fault type based on the detected current; and
   controlling driving of the inverter according a type of the detected inverter fault;
   wherein controlling the driving of the inverter comprises classifying the detected fault into a first fault type limiting an input command value according to the detected fault, a second fault type disabling the driving of the inverter, a third fault type disabling the driving of the inverter and then re-enabling the driving of the inverter according to a condition to drive the inverter, and a fourth fault type turning on/off the driving of the inverter, and wherein controlling the driving of the inverter further comprises outputting an inverter driving control signal corresponding to the detected fault type according to a preset priority.

9. The method according to claim 8, further comprising:
turning on/off the driving of the inverter for a predetermined period or for a predetermined number of times when the fourth fault type fault is detected; and
disabling the driving of the inverter when the fault is detected for the predetermined number of times or during the predetermined period.

10. The method according to claim 8, further comprising preventing an input torque command value of a specific value or greater from being input or reducing a preset command value when the first fault type is detected.

11. The method according to claim 8, further comprising disabling the driving of the inverter when the third fault type is detected, detecting whether a power state returns to a normal state, and re-enabling driving of the inverter when the power state returns to the normal state.

12. The method according to claim 8, further comprising setting the second fault type to have a highest priority when the priority is determined according to the detected fault type.

13. The method according to claim 12, further comprising setting the priority according to the detected fault type in order of the second fault type, the third fault type, the fourth type, and the first fault type.

14. The method according to claim 12, further comprising controlling to drive the inverter according to the detected fault type having the highest priority and ignoring a detected fault type having a lower priority.

* * * * *